(12) United States Patent
Rodrigues et al.

(10) Patent No.: US 9,180,963 B2
(45) Date of Patent: Nov. 10, 2015

(54) DEVICE FOR DRIVING AN AIRCRAFT WHEEL IN ROTATION

(71) Applicant: MESSIER-BUGATTI-DOWTY, Vilizy Villacoublay (FR)

(72) Inventors: Fernand Rodrigues, Vilizy-Villacoublay (FR); Nicolas Mazarguil, Vilizy-Villacoublay (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 0 days.

(21) Appl. No.: 14/337,337

(22) Filed: Jul. 22, 2014

(65) Prior Publication Data
US 2015/0027256 A1    Jan. 29, 2015

(30) Foreign Application Priority Data

Jul. 26, 2013  (FR) ..................... 13 57428
Apr. 1, 2014   (FR) ..................... 14 52886

(51) Int. Cl.
| B64C 25/40 | (2006.01) |
| B64C 25/44 | (2006.01) |
| F16D 41/16 | (2006.01) |
| F16H 3/20  | (2006.01) |
| F16H 1/06  | (2006.01) |

(52) U.S. Cl.
CPC ............... *B64C 25/405* (2013.01); *B64C 25/44* (2013.01); *F16D 41/16* (2013.01); *F16H 1/06* (2013.01); *F16H 3/20* (2013.01)

(58) Field of Classification Search
CPC ......... F16D 41/12; F16D 41/16; B64C 25/32; B64C 25/40; B64C 25/405; B64C 25/44; F16H 1/06; F16H 55/12

USPC ............ 74/405, 406, 412 R, 413, 421 R, 745; 192/45.1, 50; 244/50, 103 S
See application file for complete search history.

(56) References Cited

U.S. PATENT DOCUMENTS

| 2,050,741 | A |   | 4/1932  | Speir       |          |
| 5,187,847 | A | * | 2/1993  | Thumm et al. | 29/48.5 A |
| 5,343,992 | A | * | 9/1994  | Stark et al.| 192/45.1 |
| 5,537,899 | A | * | 7/1996  | Diedrich    | 81/57.39 |
| 5,819,899 | A | * | 10/1998 | Iga et al.  | 192/45.1 |
| 5,927,455 | A | * | 7/1999  | Baker et al.| 192/36   |

(Continued)

FOREIGN PATENT DOCUMENTS

GB    603792 A    6/1948

OTHER PUBLICATIONS

French Search Report for FR 14 52886 dated Jul. 2, 2014.
French Search Report for FR 13 57428 dated Apr. 3, 2014.

*Primary Examiner* — William Kelleher
*Assistant Examiner* — Bobby Rushing, Jr.
(74) *Attorney, Agent, or Firm* — Sughrue Mion, PLLC

(57) ABSTRACT

The invention relates to a device for driving rotation of an aircraft wheel comprising a rim (4) mounted to rotate on an axle (2) of landing gear about an axis of rotation (X), the device comprising a drive ring gear (103) and a drive actuator (101) having an outlet pinion (102) that co-operates with the drive ring gear to drive the wheel in rotation. The drive ring gear is mounted to rotate about the axis of the rim of the wheel, the drive device including selective coupling means (150) that are operable to link the rim and the drive ring gears together in rotation, or to disconnect them.

6 Claims, 5 Drawing Sheets

(56) References Cited

U.S. PATENT DOCUMENTS

| | | | |
|---|---|---|---|
| 6,843,152 B2 * | 1/2005 | Byford | 74/813 L |
| 7,766,790 B2 * | 8/2010 | Stevenson et al. | 477/8 |
| 2011/0156472 A1 | 6/2011 | Bucheton et al. | |
| 2013/0167678 A1 | 7/2013 | Eluard | |

* cited by examiner

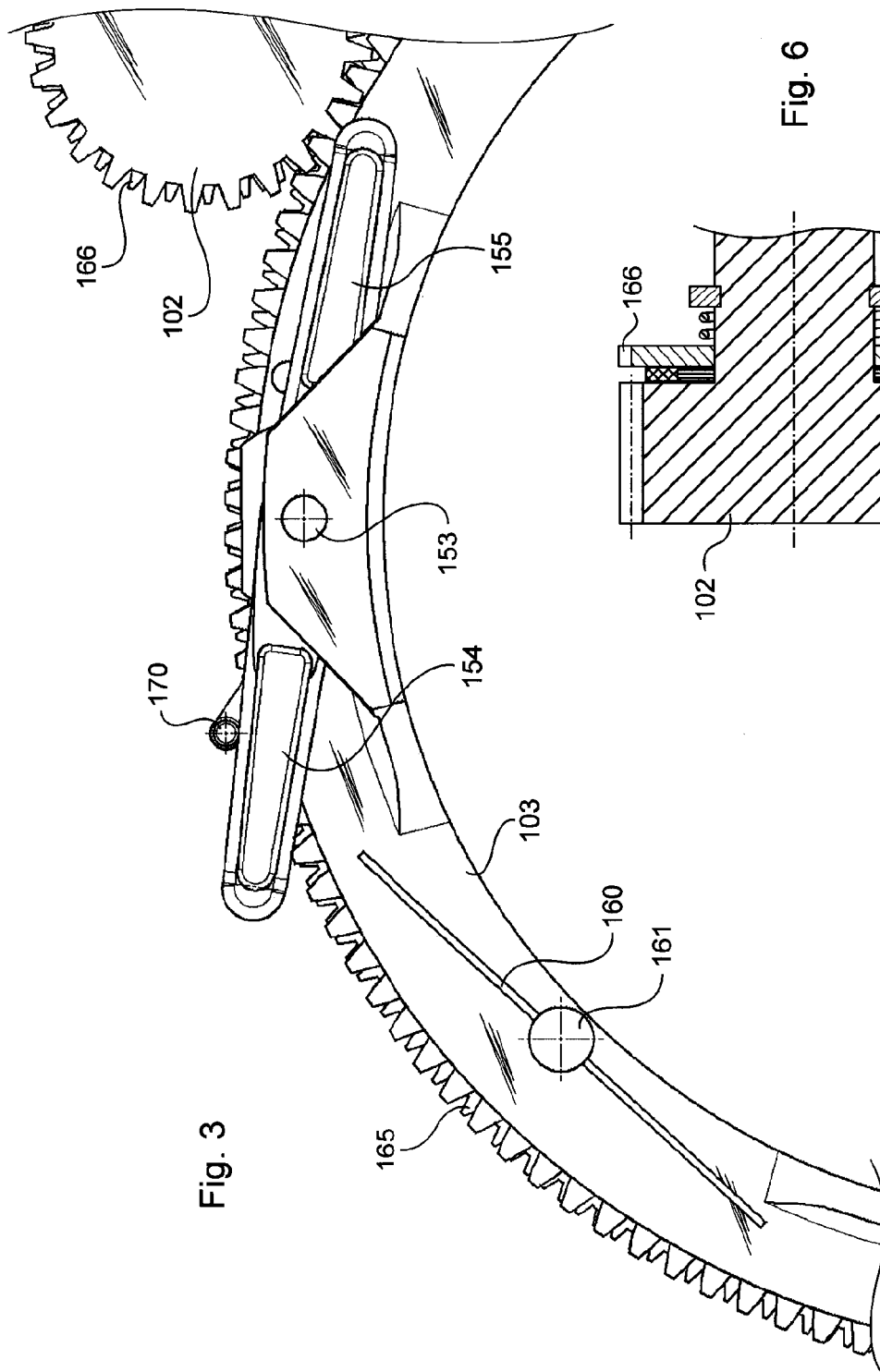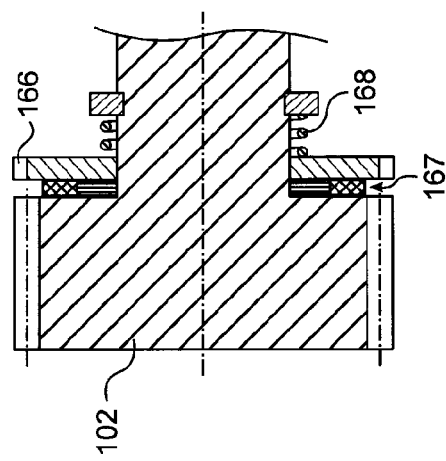

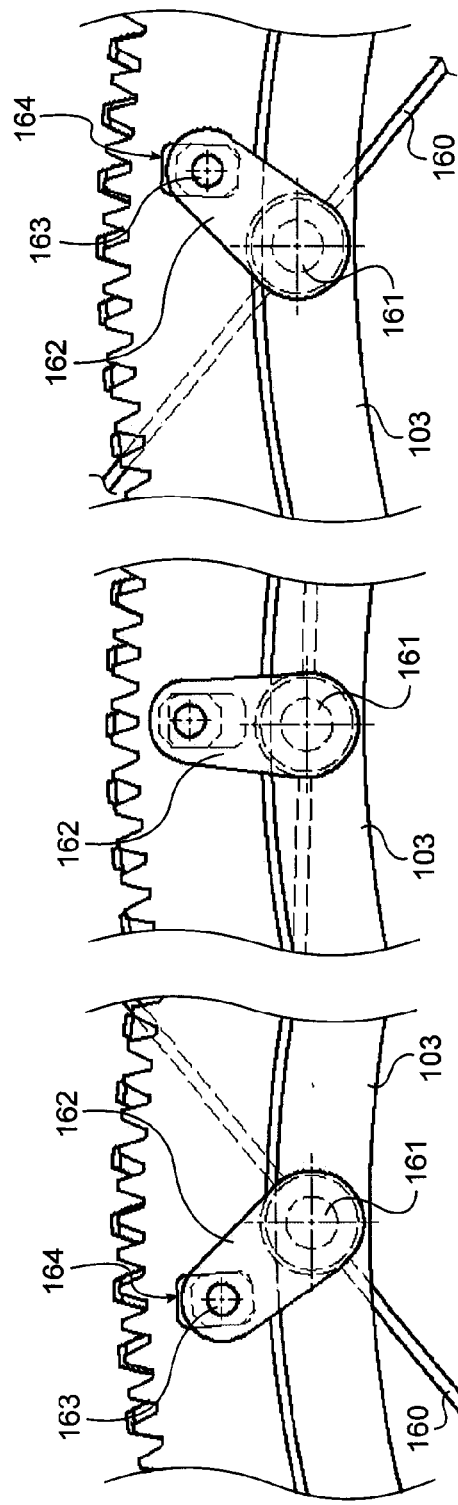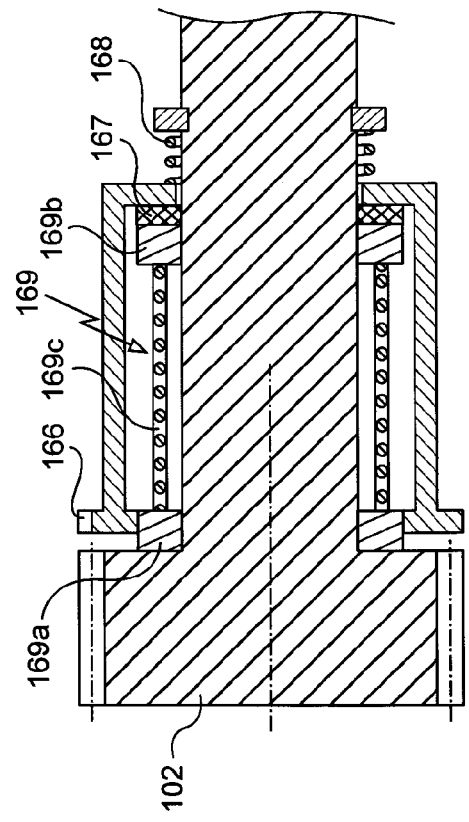

DEVICE FOR DRIVING AN AIRCRAFT WHEEL IN ROTATION

The invention relates to a device for driving an aircraft wheel in rotation.

TECHNOLOGICAL BACKGROUND OF THE INVENTION

Devices are known for driving rotation of an aircraft wheel carried by an axle of landing gear. Such devices generally comprise a drive actuator having a shaft with an outlet pinion for driving a ring gear secured to a rim of the wheel. For safety reasons, the actuator is generally provided with a coupling member that is operable to selectively couple or decouple a motor of the actuator with the outlet shaft of the actuator, such that during stages in which the wheel of the aircraft is providing drive (e.g. when landing), it cannot drive the motor.

Nevertheless, such provisions are found to be expensive and complex to manage.

OBJECT OF THE INVENTION

An object of the invention is to propose a device for driving rotation of an aircraft wheel in which the positive connection between the wheel of the aircraft and the motor of the drive member can be disconnected simply.

SUMMARY OF THE INVENTION

In order to achieve this object, the invention provides a device for driving rotation of an aircraft wheel that includes a rim mounted to rotate on an axle of landing gear about an axis of rotation, the device comprising a drive ring gear secured to the rim of the wheel and a drive actuator including an outlet pinion that co-operates with the drive ring gear in order to drive the wheel in rotation. According to the invention, the drive ring gear is mounted to rotate about the axis of the rim of the wheel, with the drive device including selective coupling means operable to connect the ring gear of the wheel in rotation with the drive ring gear, or to disconnect them.

Thus, the drive ring gear and the outlet pinion remain permanently engaged, but disconnecting the ring gear allows the aircraft wheel to rotate without that driving the drive ring gear, and thus without driving the outlet pinion of the drive actuator, thereby protecting the motor from being made to rotate too fast.

In a preferred embodiment, the coupling means comprise first pawls arranged between the rim of the wheel and the drive ring gear to be movable between a retracted position in which they leave relative movement in rotation free between the drive ring gear and the rim, and an engaged position in which they enable the rim to be driven in rotation by the drive ring gear in a first direction of rotation.

Preferably, the coupling means comprise second pawls arranged between the rim and the drive ring gear to be movable between a retracted position in which they leave relative movement in rotation free between the drive ring gear and the rim, and an engaged position in which they enable the rim to be driven in rotation by the drive ring gear in a second direction of rotation.

In a particular embodiment, the first and second pawls are arranged in pairs and they are carried by the drive ring gear, each pair sharing a common pivot, their respective angular positions being controlled by means of blades extending between two consecutive pairs and pivotally mounted on the drive ring gear so as to raise selectively one or the other of the pawls in order to bring it into engagement with the rim.

It is then preferable for each of the blades to be associated with a control lever of angular position that is controlled by an auxiliary ring gear mounted on the same axis as the drive ring gear such that rotary movement thereof relative to the drive ring gear causes the lever to turn and thus causes the blade to turn.

DESCRIPTION OF THE FIGURES

The invention can be better understood in the light of the following description of a particular embodiment of the invention given with reference to the figures of the accompanying drawings, in which:

FIG. 3 is a fragmentary face view of the drive ring gear and of the selective coupling means;

FIGS. 5A to 5C show the various positions of the control levers for controlling the blades of FIG. 4;

FIG. 6 is a section view of the pinions driven by the drive actuator; and

FIG. 7 is a section view of the same pinions in a variant embodiment.

DETAILED DESCRIPTION OF A PARTICULAR EMBODIMENT OF THE INVENTION

Figure 1:
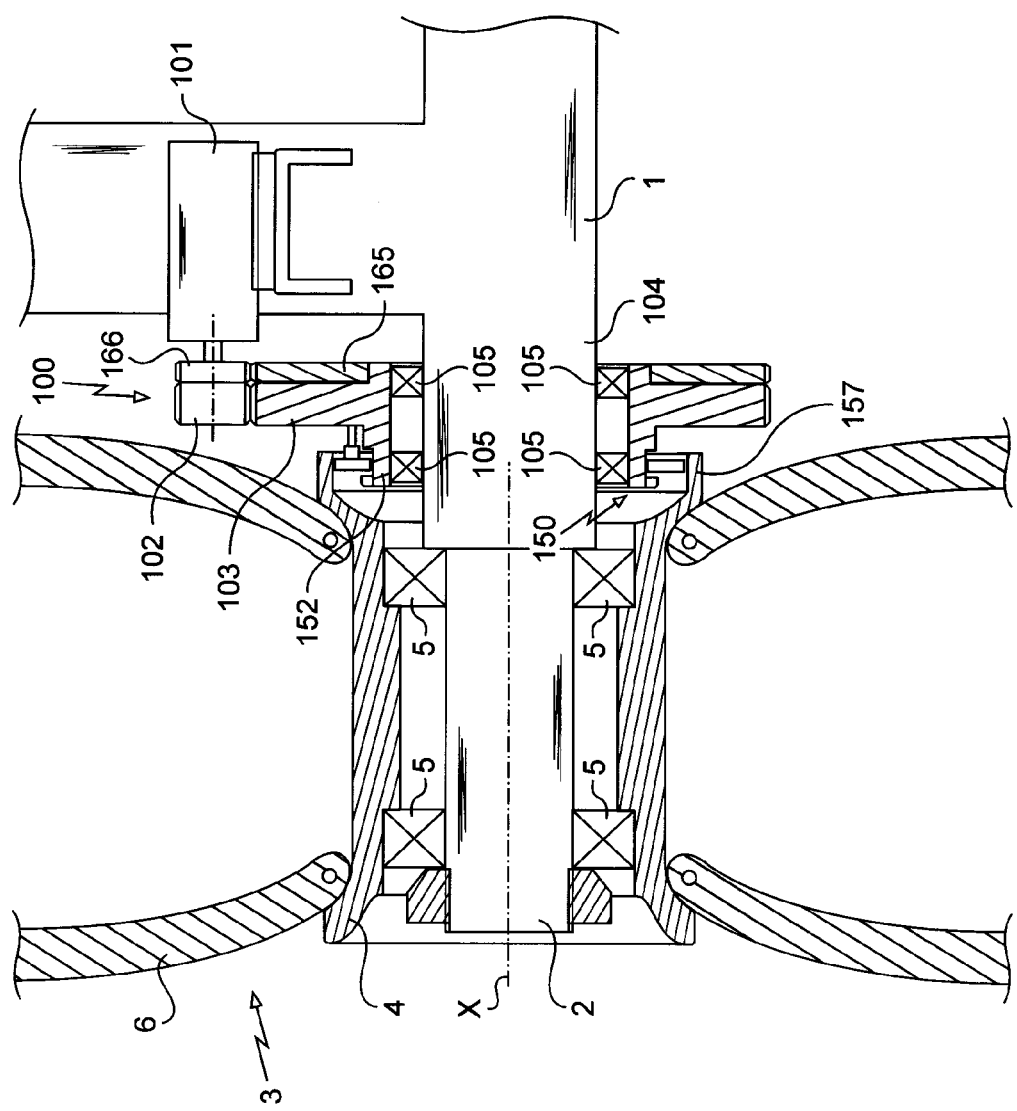
FIG. 1 is a sectional diagram of the drive device of the invention in position on aircraft landing gear.

With reference to FIG. 1, the device of the invention is mounted on aircraft landing gear 1 having an axle 2 on which a wheel 3 is mounted to rotate about an axis of rotation X. The wheel 3 has a rim 4 that rotates on the axle via bearings 5. The rim carries a tire 6. The device 100 of the invention is installed on the side of the rim and includes a drive actuator 101 fastened to the landing gear and including a motor (not shown) for rotating a drive pinion 102. The drive pinion co-operates with a drive ring gear 103 mounted to rotate on a support 104 secured to the axle 2 about an axis of rotation that coincides with the axis of rotation of the wheel 3, by means of bearings 105.

The device has selective coupling means 150 enabling the drive ring gear 103 to be coupled or decoupled in rotation relative to the rim 4 of the wheel 3. These coupling means enable the ring gear and the wheel to be connected together or disconnected, while the drive pinion 102 remains permanently engaged with the drive ring gear 103.

Figure 2:
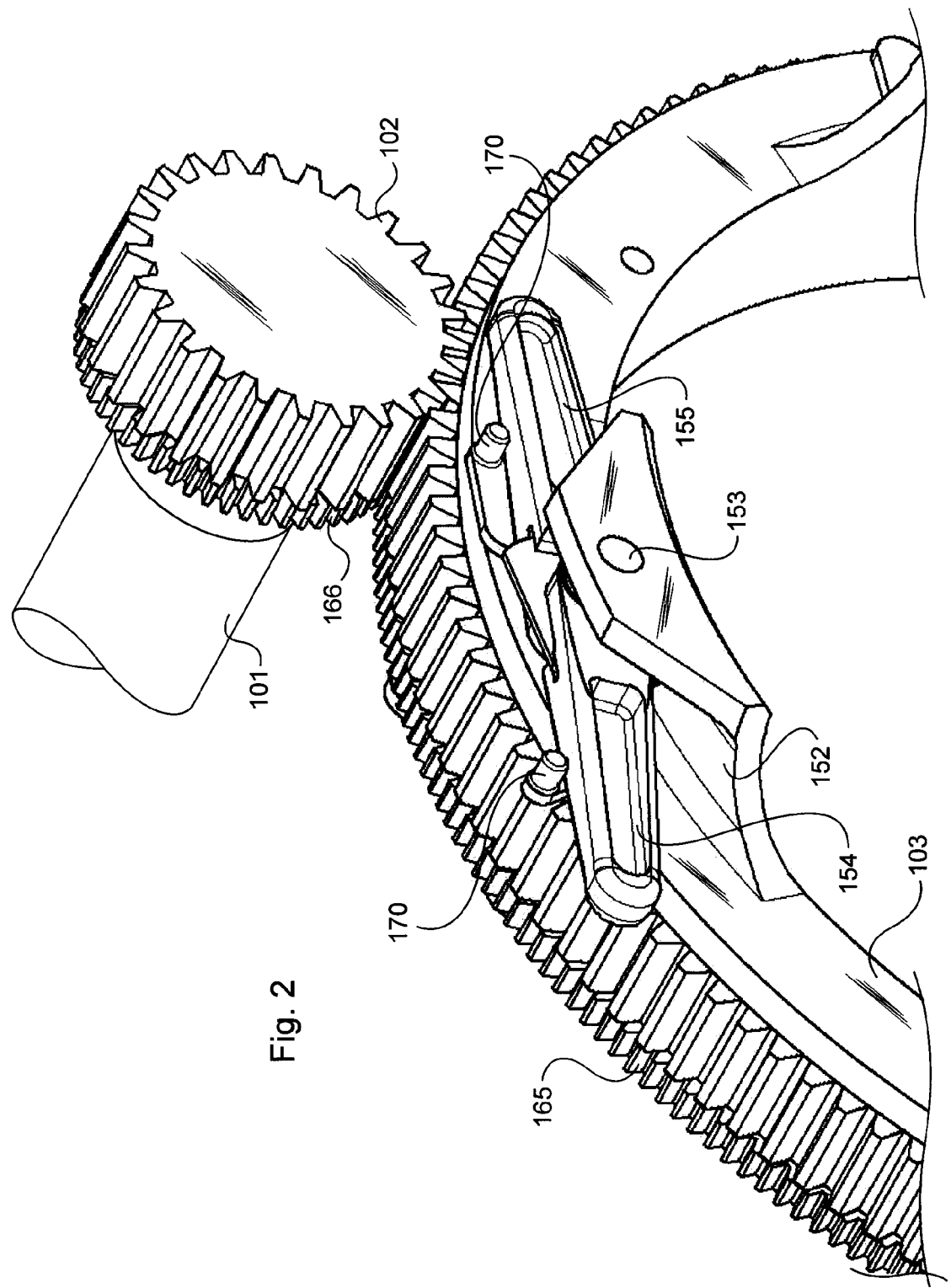
FIG. 2 is a fragmentary perspective view of two ring gears on a common axis and of two pinions on a common axis of the FIG. 1 drive device.
Figure 4:
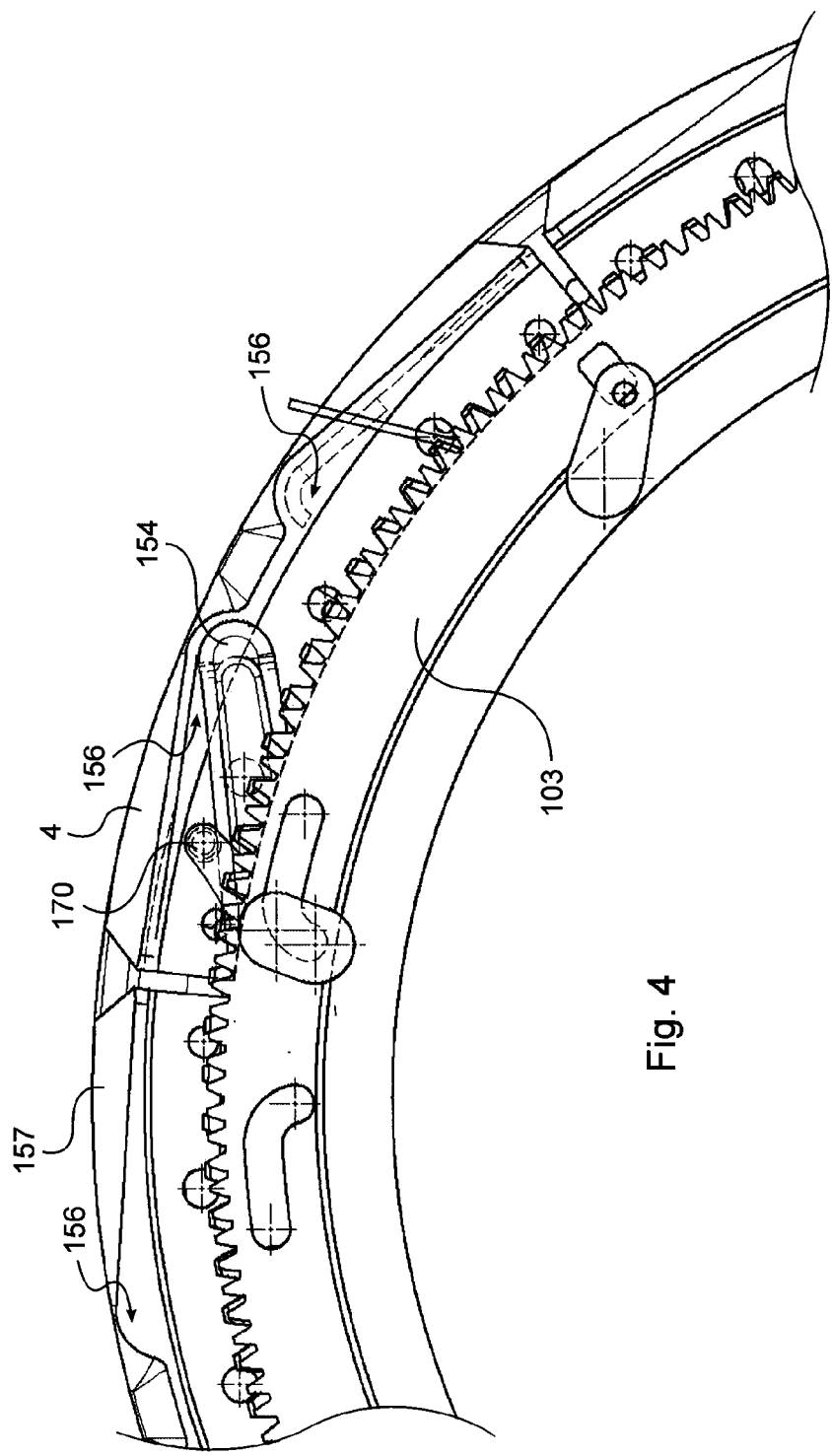
FIG. 4 shows the other face of the ring gear of FIG. 3, together with the facing portion of the wheel rim.

The coupling means are described in detail below with reference to FIG. 2 et seq. The coupling means 150 comprise arms hinged on brackets 152 of the ring gear. In this example, the arms are grouped together in pairs and are hinged on a common pivot 153. Each of the pivots 153 thus has a first arm 154 pointing in one direction and a second arm 155 pointing in the opposite direction. The arms 154 and 155 have rounded ends suitable for being received in respective cavities 156 formed in a skirt 157 of the rim (visible in FIG. 4) that overlies the brackets 152 of the drive ring gear 103. In the position shown in FIG. 2, when all of the first arms 154 are raised to co-operate with the rim, they act as pawls that enable the rim to be driven by the toothed drive wheel in a first direction of rotation by co-operation between the ends of the arms 154 and the facing cavities 156. On the contrary, when it is the second arms 155 that are raised, they act as pawls that allow the rim to be driven by the drive ring gear in a second direction of rotation. The arms 154, 155 are thus movable between a retracted position (the position of the arm 155 in FIG. 2) in which they allow free relative movement in rotation between the ring gear and the rim, and an engaged position in which they co-operate with the rim 4 in order to enable it to be driven by the drive ring gear 103.

In this example, the arms are controlled as follows. Blades 160, here in the form of spring blades, are arranged on the drive ring gear 103 between two facing arms in order to pivot between two extreme positions in which they lift a respective one of the facing arms 154, 155 in order to bring it into its engaged position. These extreme positions are shown in FIGS. 5A and 5C. Each blade 160 is associated with a pivot 161 that passes through the thickness of the drive ring gear 103 in order to terminate on a control lever 162 that carries a lug 163 at its end. Said lug 163 penetrates into radial slots 164 formed in an auxiliary ring gear 165 that is mounted to rotate about the same axis as the drive ring gear. It then suffices to organize a little differential rotation between the auxiliary ring gear and the drive ring gear in order to cause the control lever to pivot, and in so doing cause the blade 160 to pivot, thereby raising one of the arms into its engagement position.

This small differential movement in rotation is obtained as follows in this example. The drive pinion 102 is paired with a control pinion 166. It is received on the same outlet shaft of the drive actuator 101, but it is driven by means of a friction device 167, thereby enabling the control pinion to slip as soon as an opposing torque threshold is reached. The threshold is generated by a spring 168 pressing the control pinion 166 against the friction device 167.

The dimensional characteristics of the pinions 102 and 166, and also of the ring gears 103 and 165 (i.e. numbers of teeth, primitive diameters, . . . ) are selected in such a manner that when the pinions 102 and 166 rotate at the same speed, the drive ring gear 103 and the auxiliary ring gear 165 rotate at speeds that are slightly different, thereby giving rise to relative rotary movement between the two ring gears.

Thus, when the drive actuator 101 is started, it drives the drive ring gear 103 and the auxiliary ring gear 165 at speeds that are slightly different, thereby causing the blades 160 to turn and thus turning some of the arms (i.e. all of the first arms or else all of the second arms) towards their engaged positions in which they couple the drive ring gear 103 in rotation with the rim 4 of the wheel 3. When the arms reach the engaged position, they prevent the auxiliary ring gear 165 from turning relative to the drive ring gear 103, thereby causing the control pinion 166 to slip relative to the drive pinion 102.

When it is desired to uncouple the drive ring gear 103 from the rim 4, it suffices to cause the drive actuator to rotate in the opposite direction. The ring gears then adopt differential rotary motion in the opposite direction, thereby returning the blades to the neutral position as shown in FIG. 5B. Those arms that were raised thus return to their retracted position. In order to guarantee that the arms do indeed return to the retracted position, fingers 170 (visible in FIG. 2) are pivotally mounted on the drive ring gear 103 on the same principle as the blades in order to disengage and enable one of the arms to be lifted, or on the contrary to move down and push the arm towards the retraced position.

The two ring gears may be controlled in numerous ways. By way of example, it is possible to incorporate an electromagnet for selectively activating or neutralizing the force exerted by the friction device 167 used for driving the control pinion 166 together with the drive pinion 102.

In a variant shown in FIG. 7, an angular offset member 169 is interposed between the friction device 167 and the drive pinion 102, which offset member 169 has internal return means and serves to impart an angular offset between the two pinions. For example, the angular offset member is a spring box having two end plates 169a and 169b, one of which is fastened to the drive pinion 102 and the other of which bears against the disks of the friction device 167, the two end plates being connected together by means of one or more torsion springs 169c that allow the end plates to turn relative to each other starting from an initial angular position against an internal return torque exerted by said torsion springs. Internal abutments allow the two plates to turn relative to each other up to a determined maximum angular offset. This maximum angular offset is preferably selected to be slightly greater than the offset of the drive ring gear 102 relative to the auxiliary ring gear 165 multiplied by the gear ratio between the pinions and the ring gears.

The torsion spring(s) is/are dimensioned so as to present a threshold torque that is less than the torque that can be generated by the friction device 167 under the action of the spring 168. The assembly then operates as follows. When the drive actuator 101 is started, it drives the drive pinion 102, which in turn drives the drive ring gear 103. Since the torque generated by the friction device 107 is higher than the threshold torque of the angular offset member 169, it gives rise to an angular offset between the pinions until the maximum angular offset is reached. Thereafter both pinions are driven simultaneously until the arms 154 or 155 reach their engaged position, as explained above.

When the aircraft is stopped, and the arms 154 or 155 are unloaded, the internal return within the angular offset device 169 constrains it to return into its initial angular position, thereby causing the control pinion 167 to turn in the opposite direction, and thus automatically causing the arms 154 or 155 to return to the retracted position.

The invention is not limited to the above description, but on the contrary covers any variant coming within the ambit defined by the claims.

In particular, although the control pinion is secured to the drive pinion in this example by means of a threshold friction device, any other device could be used (magnetic, hydraulic, . . . ) providing it allows the two pinions to slip when the ring gears are prevented from turning relative to each other.

The invention claimed is:

1. A device for driving rotation of an aircraft wheel comprising a rim (4) mounted to rotate on an axle (2) of landing gear about an axis of rotation (X), the device comprising a drive ring gear (103) and a drive actuator (101) having an outlet pinion (102) that co-operates with the drive ring gear to drive the wheel in rotation, the drive ring gear being mounted to rotate about the axis of the rim of the wheel, the drive device including selective coupling means (150) that are operable to link the rim and the drive ring gears together in rotation, or to disconnect them, the device being characterized in that the coupling means comprise:

first pawls (154) arranged between the rim and the drive ring gear to be movable between a retracted position in which they leave relative movement in rotation free between the drive ring gear and the rim, and an engaged position in which they enable the rim to be driven in rotation by the drive ring gear in a first direction of rotation; and second pawls (155) arranged between the rim and the drive ring gear to be movable between a retracted position in which they leave relative movement in rotation free between the drive ring gear and the rim, and an engaged position in which they enable the rim to be driven in rotation by the drive ring gear in a second direction of rotation;

the first and second pawls being arranged in pairs and carried by the drive ring gear, each pair sharing a common pivot (153), their respective angular positions being controlled by means of blades (160) extending between two consecutive pairs and pivotally mounted on the drive ring gear (103) so as to raise selectively one or the other of the pawls in order to bring it into engagement with the rim.

2. A device according to claim 1, wherein each blade (160) is associated with a control lever (163) of angular position that is controlled by an auxiliary ring gear (165) mounted on the same axis as the drive ring gear such that rotary movement thereof relative to the drive ring gear causes the lever to turn and thus causes the blade to turn.

3. A device according to claim 2, wherein the control lever (163) of each of the blades includes a lug (163) that penetrates into a longitudinal slot in the auxiliary ring gear (165).

4. A device according to claim 2, wherein the auxiliary ring gear (165) is driven in rotation by a control pinion (166) on the same axis as the drive pinion (102) and rotating therewith, the pinions and the ring gears having dimensional characteristics such that the drive actuator causing the pinions to rotate at the same speed gives rise to differential rotation between the ring gears.

5. A device according to claim 4, wherein the control pinion (166) is connected to rotate with the drive pinion (102) by a threshold friction device (167, 168) such that the control pinion rotates with the drive pinion until a torque exceeding a given threshold causes it to slip.

6. A device according to claim 5, wherein an angular offset device (169) with internal return means is associated with the friction device such that the control pinion (102) turns with the drive pinion (166) only when a maximum angular offset allowed by the angular offset device has been reached.

\* \* \* \* \*